Sept. 22, 1925.
E. T. ALEXANDER
MILK BOTTLE
Filed March 10, 1924
1,554,191
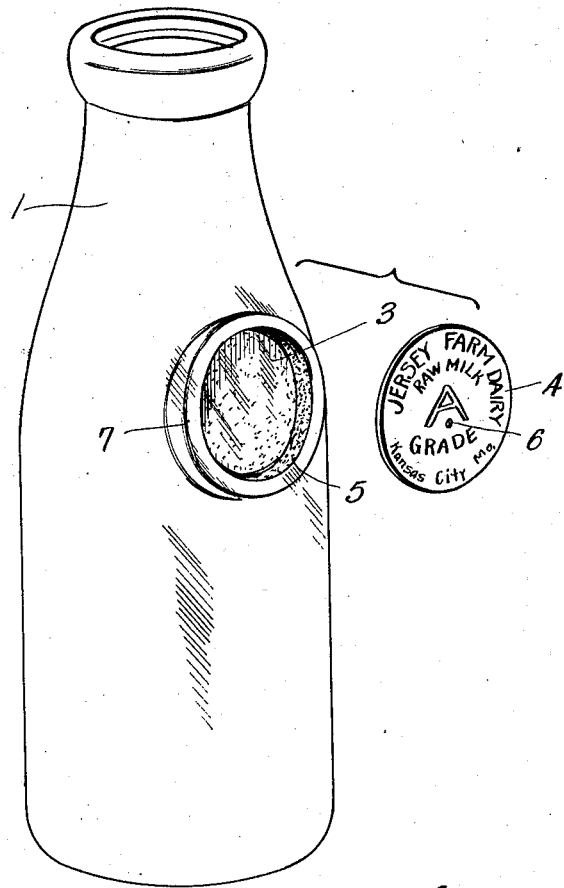
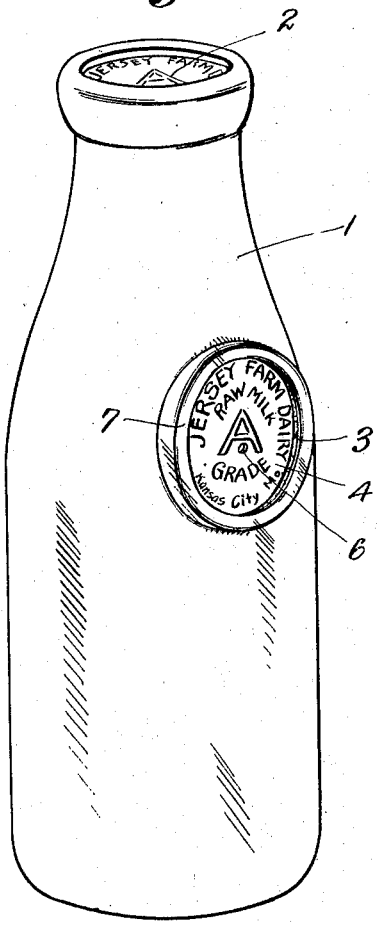
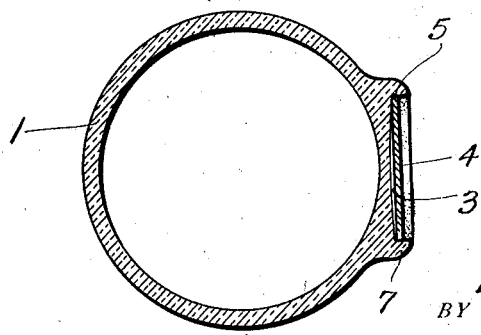
INVENTOR
Edwin T. Alexander.
BY
ATTORNEY Patented Sept. 22, 1925.

1,554,191

UNITED STATES PATENT OFFICE.

EDWIN T. ALEXANDER, OF KANSAS CITY, MISSOURI.

MILK BOTTLE.

Application filed March 10, 1924. Serial No. 698,129.

*To all whom it may concern:*

Be it known that I, EDWIN T. ALEXANDER, a citizen of the United States, residing at Kansas City, in the county of Jackson and State of Missouri, have invented certain new and useful Improvements in Milk Bottles; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to containers for milk and the like and the primary object is to provide a milk bottle with an indicia receiving pocket on the vertical wall thereof adapted to receive and retain an indicia carrying element, for example, a disk containing certain information.

It is common practice to serve milk to guests in a restaurant and the like in the original container, usually a milk bottle. The milk bottle generally has a cap indicating the origin of the milk and the grade of milk, whether A, B or C grade. The bottle usually comes to the customer with the cap removed, so that the customer has no means of knowing which of the three grades of milk is being served, nor is he sure that the milk is from any particular dairy.

My invention contemplates the provision of an indicia element receiving pocket in the vertical wall of the bottle so that a disk, generally the one resembling the milk bottle top can be received in the pocket, thereby indicating to the customer the grade of the milk being served and the origin thereof. The device will be clearly described hereinafter, reference being had to the accompanying drawings, in which Fig. 1 is a perspective view of a milk bottle and a disk to be received in the pocket.

Fig. 2 is a perspective view of a milk bottle with the disk in the pocket, and

Fig. 3 is a cross sectional view through the milk bottle and the disk.

The milk bottle 1 is of usual construction with the under cut groove at the top to receive the usual milk bottle cap 2. My invention differentiates from the normal milk bottle, in that the vertical wall is provided with a pocket 3 to receive an indicia element 4. The indicia element may consist of an ordinary fibre disk with appropriate indicia thereon.

The pocket 3 is shown as an annular pocket with a roughened surface 5 to receive the disk 4 which may be snapped into place and in order to prevent an air cushion being formed back of the disk, I prefer to construct the disk with a perforation 6 therethrough, so that the air may escape. As shown in Fig. 3 the diameter of the disk is slightly greater than the diameter of the pocket therefore it is caused to bulge slightly away from the floor of the pocket. The advantage of having the disk slightly larger than the pocket is that it may be snapped in place by uniform pressure of the periphery of the disk against the wall of the pocket.

The pocket is shown as formed with an annular collar or ring 7 although I do not wish to be limited to any particular form of pocket, the essential feature of the invention residing in an indicia element receiving pocket in the vertical wall of the bottle so that it will be visible to the customer upon presentation of the bottle.

It will be apparent from the foregoing that inasmuch as the disk 4 is inserted in the pocket 3, at the time the bottle is being filled that the customer will be apprised of the fact that he is obtaining milk from a certain dairy, of a certain grade and usually the disk will contain indicia indicating the date the milk was placed in the bottle, and whether the milk is raw milk or pasteurized milk.

What I claim and desire to secure by Letters-Patent is:

A milk bottle having a pocket in the vertical wall thereof with a roughened surface to receive a disk of greater diameter than the pocket.

In testimony whereof I affix my signature.

EDWIN T. ALEXANDER.